UNITED STATES PATENT OFFICE.

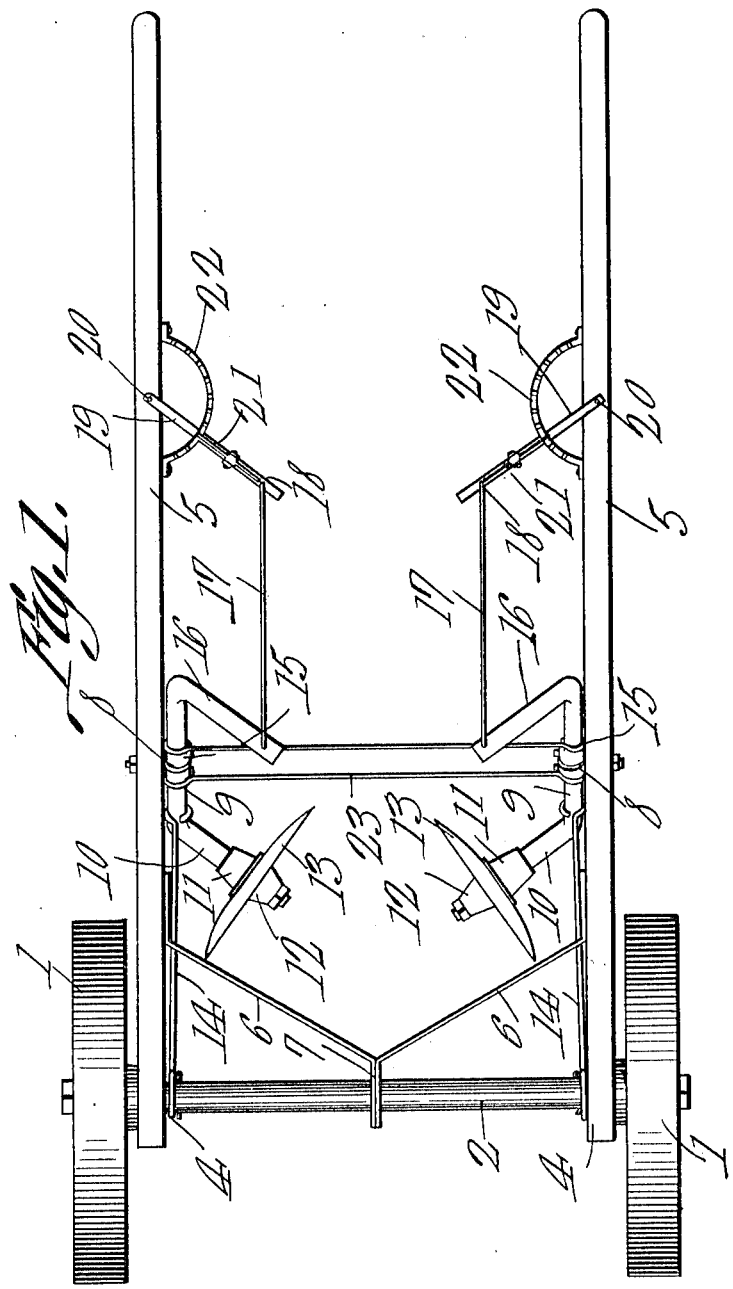

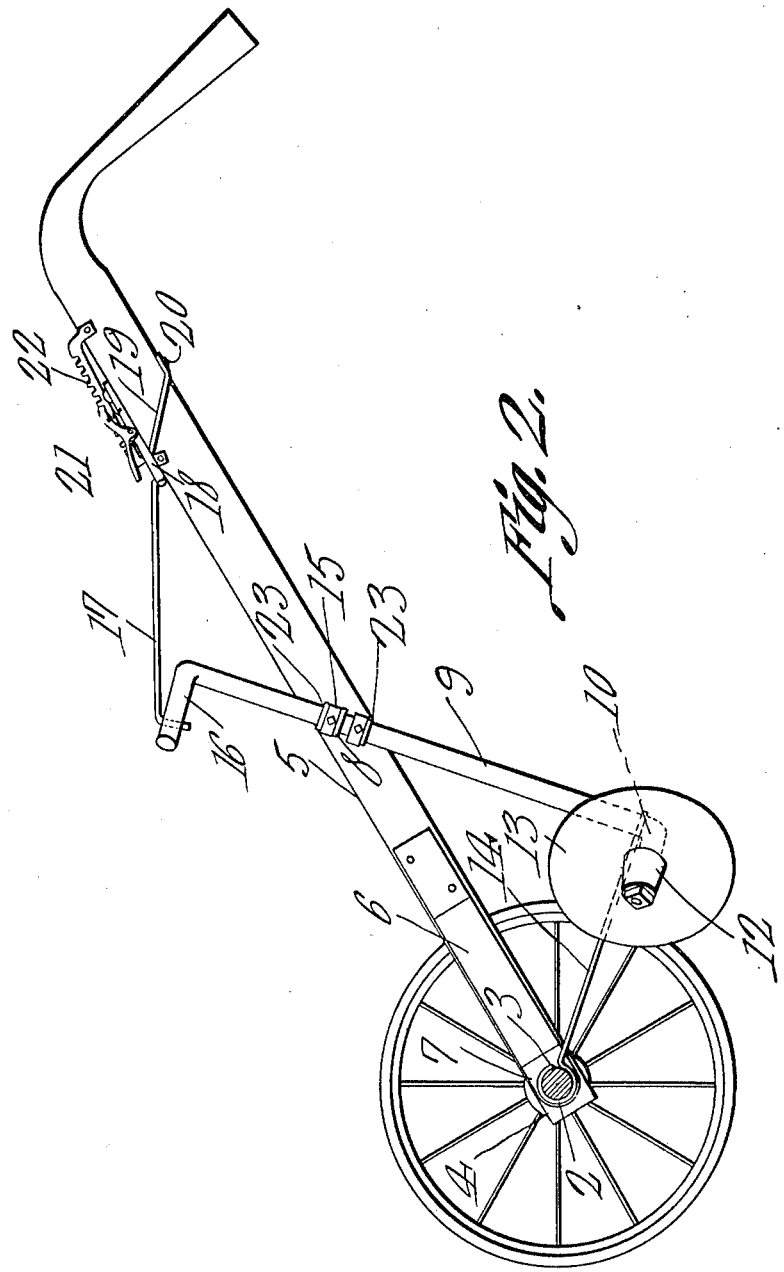

BENJAMIN H. PHILLIPS, OF KING CITY, MISSOURI.

CULTIVATOR.

1,001,439.

Specification of Letters Patent. Patented Aug. 22, 1911.

Application filed May 18, 1911. Serial No. 628,080.

*To all whom it may concern:*

Be it known that I, BENJAMIN H. PHILLIPS, a citizen of the United States, residing at King City, in the county of Gentry and State of Missouri, have invented a new and useful Cultivator, of which the following is a specification.

This invention relates to an improvement in cultivators, the primary object of which is the provision of a manually operated garden cultivator, having a wheeled axle and handles pivoted thereto, carrying each adjustably mounted rotary disks, which may be adjusted to any angle or height to accomplish the desired cultivation, said disks being disposed to straddle the row, or work between the rows.

A further object of this invention, is the provision of independently adjustable rotary cultivating disks, one disk being bodily carried by each of the operating handles, and provided with means for angular or vertical adjustment, connected to the handle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a top plan view of the cultivator. Fig. 2 is a longitudinal sectional view thereof.

Referring to the drawings, the numeral 1 designates the two carrying wheels, which are rotatably mounted upon the axle 2, to which at 3, are pivoted the lower ends 4, of the two handles 5 and 5'. Bracing these handles at their pivotal ends, are the respective braces 6, whose short inturned ends 7, are also pivotally connected to the axle centrally thereof. By this means the handles 5 and 5', may be moved up and down, so that their outer ends may assume different heights from the ground to accommodate the implement to the use of short and tall persons.

Connected to each handle intermediate of their ends, are the eyed supports 8, which have mounted therein, the cylindrical standards 9, each one of which is constructed similarly, and has the inturned lower arm or end 10, carrying the limiting collar 11, between which and the locking collar 12, is rotatably mounted the disk cultivator 13. By this construction, the standard may be turned in any direction to bring the disks parallel to each other or to assume any desired angle or angles with relation to each other, the brace rods 14, being employed to brace these standards from the axle. The two collars 15, which are adjustably mounted upon each standard 9, are adapted to provide adjustable means for connecting the standards to their respective handle, so that the handles may be raised or lowered for use by tall or short operators. The two rods 23 connect the two standards 9, and consequently the handles 5 and 5' relatively to each other, but are loose enough to permit the handles to have a slight independent vertical movement without affecting the other handles, thus providing means whereby the disks and handles may be independently raised and lowered occasionally by the surface traversed, and also permit the operator to bear down with greater force with one hand than the other, to operate deeper when desired. The independent pivoting of the handles and braces 6 will also permit this action when so desired, the handles being, however held in approximately the same parallelism.

The upper ends 16 of the standards 9, are inwardly extending arms, and are connected by means of the rods 17, to their respective levers 18. These levers, as shown have the bracing member 19, so that the bolt 20 can connect the levers 18 to the top and lower edges of the handles, and are placed in inwardly projecting operable position, so that the operator, can readily grip the levers 18, and manipulate the locking levers 21 carried thereby, to release them from the toothed racks 22, so that the standards 9, may be turned at any desired angle, and be locked in such adjustment.

It is evident from the foregoing that the disks 13 will roll the dirt gently around the growing plants, covering up small weeds, and at the same time hill up the plants without covering them entirely and injuring them by violently shocking them when the dirt is roughly thrown against them. It is also evident that the disks may be changed to operate at different depths, and to throw more or less dirt as the plants stand, while on the move; and that the standards may be adjusted for raising or lowering the handles, thus making a most useful and convenient garden implement.

What is claimed, is:—

1. In a cultivator, an axle, wheels carrying the same, two handles pivoted to the axle, a brace connecting each handle to the axle to hold the handles in parallelism, a standard vertically adjustable and rotatably mounted to each handle, a disk carried at the lower end of each standard, means engaging the standards for holding the handles spaced apart, a hand lever pivoted to each handle, means for locking the hand lever in adjusted position, and a rod connecting the upper end of the standard and hand lever of respective handles together.

2. In a cultivator, an axle, wheels carrying the same, two handles pivoted to the axle and capable of independent adjustment and movement with relation to each other, a standard having inwardly turned terminals, a disk rotatably mounted upon the lower terminal of each standard, a hand lever pivoted to each handle beyond the standard, means for rotatably securing each standard to its handle, and a rod connecting a hand lever and the upper terminal of its respective standard together.

In testimony that I claim the foregoing as my own, I have hereto affixed my signature in the presence of witnesses.

BENJAMIN H. PHILLIPS.

Witnesses:
 JOHN TURNER,
 HATTIE M. PHILLIPS,
 B. G. ROSS.

---

Copies of this patent may be obtained for five cents each, by addressing the "Commissioner of Patents, Washington, D. C."